United States Patent
Resch et al.

(10) Patent No.: US 11,019,146 B2
(45) Date of Patent: *May 25, 2021

(54) SEGMENTING AND MERGING DATA IN A DISPERSED STORAGE NETWORK

(71) Applicant: International Business Machines Corporation, Armonk, NY (US)

(72) Inventors: Jason K. Resch, Chicago, IL (US); Ram Narayanan, Chicago, IL (US); Andrew D. Baptist, Mt. Pleasant, WI (US); Praveen Viraraghavan, Chicago, IL (US); Wesley B. Leggette, Chicago, IL (US); Ethan S. Wozniak, Park Ridge, IL (US); Manish Motwani, Chicago, IL (US); Bart R. Cilfone, Marina del Rey, CA (US); Greg R. Dhuse, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/571,742

(22) Filed: Sep. 16, 2019

(65) Prior Publication Data

US 2020/0304573 A1 Sep. 24, 2020

Related U.S. Application Data

(63) Continuation of application No. 16/360,978, filed on Mar. 21, 2019, now Pat. No. 10,834,196.

(51) Int. Cl.
*H04L 29/08* (2006.01)
*G06F 3/06* (2006.01)

(52) U.S. Cl.
CPC ........ *H04L 67/1097* (2013.01); *G06F 3/0604* (2013.01); *G06F 3/067* (2013.01); *G06F 3/0614* (2013.01); *G06F 3/0646* (2013.01)

(58) Field of Classification Search
CPC ... H04L 67/1097; G06F 3/0614; G06F 3/067; G06F 3/0604; G06F 3/0646
See application file for complete search history.

(56) References Cited

U.S. PATENT DOCUMENTS

| 7,000,143 B2 * | 2/2006 | Moulton | G06F 11/1076 711/114 |
| 7,240,236 B2 * | 7/2007 | Cutts | G06F 11/1076 714/6.1 |

(Continued)

OTHER PUBLICATIONS

Notice of Allowance dated Jul. 22, 2020 in U.S. Appl. No. 16/360,978, 8 pages.

(Continued)

*Primary Examiner* — Thomas J Dailey
(74) *Attorney, Agent, or Firm* — James Nock; Andrew D. Wright; Roberts Calderon Safran & Cole, P.C.

(57) ABSTRACT

A method for execution by a dispersed storage and task (DST) processing unit includes determining a first optimal slice size requirement is determined for a first independent data element (IDE). The first IDE is split into a first plurality of IDEs based on determining the first IDE compares unfavorably to the first optimal slice size requirement. An error coding function is performed on the first plurality of IDEs to produce a set of encoded slices for each of the first plurality of IDEs for transmission to storage units. A subset of additional IDEs are selected to be merged into a merged IDE based on a second optimal slice size requirement, and continuous content of the subset of additional IDEs is concatenated to produce the merged IDE. The error coding function is performed on the merged IDE to produce a (Continued)

second set of encoded slices for transmission to storage units.

20 Claims, 11 Drawing Sheets

(56) References Cited

U.S. PATENT DOCUMENTS

| | | | | |
|---|---|---|---|---|
| 8,566,354 B2* | 10/2013 | Grube | ................ | G06F 11/0727 |
| | | | | 707/782 |
| 8,627,178 B2* | 1/2014 | Clifone | ............... | G06F 11/1076 |
| | | | | 714/751 |
| 8,819,452 B2* | 8/2014 | Gladwin | ............... | G06F 21/602 |
| | | | | 713/193 |
| 8,909,858 B2* | 12/2014 | Resch | ................ | H04L 67/1097 |
| | | | | 711/100 |
| 10,127,236 B1 | 11/2018 | Zhou et al. | | |
| 2015/0242272 A1 | 8/2015 | Resch | | |
| 2016/0328294 A1 | 11/2016 | Gladwin et al. | | |
| 2019/0065766 A1* | 2/2019 | Resch | .................. | G06F 3/0659 |

OTHER PUBLICATIONS

Office Action dated Mar. 19, 2020 in U.S. Appl. No. 16/360,978, 7 pages.
"List of IBM Patents or Patent Applications Treated as Related", dated Jun. 17, 2020, 1 page.

\* cited by examiner

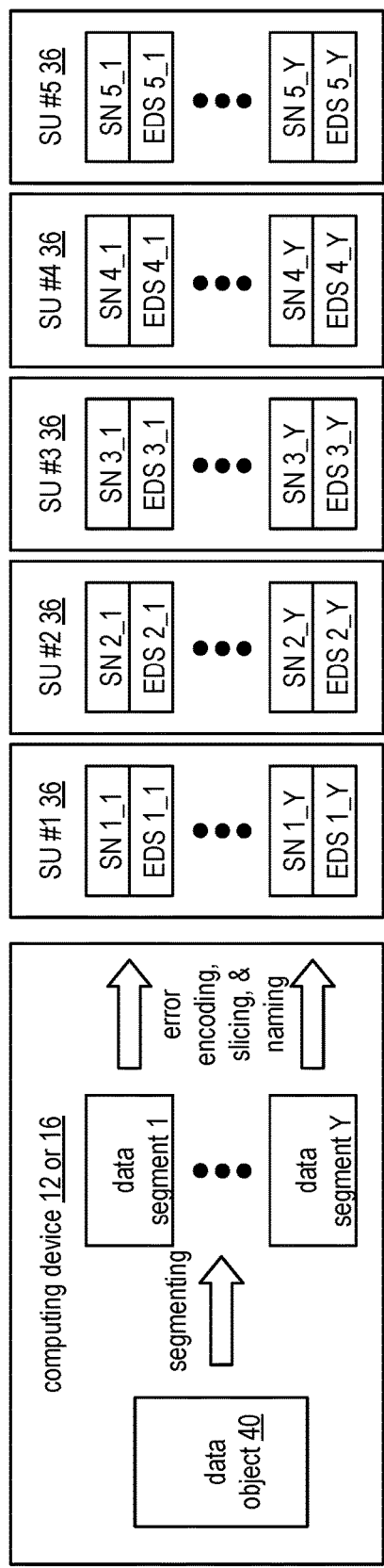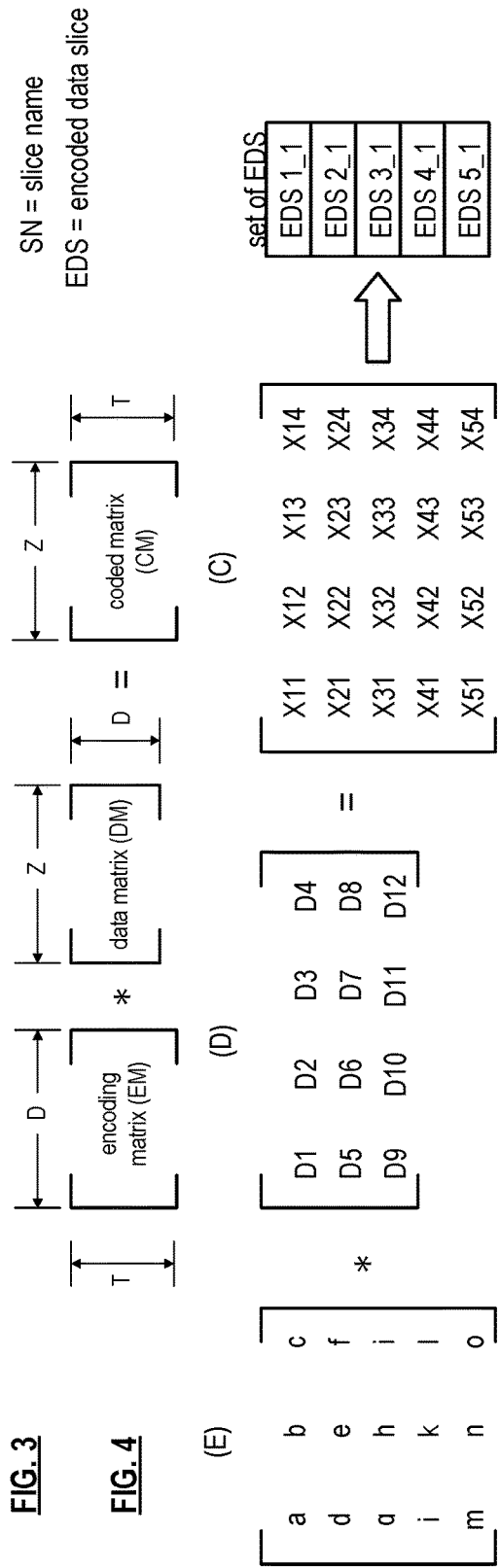
FIG. 3
FIG. 4
FIG. 5
FIG. 6

SEGMENTING AND MERGING DATA IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
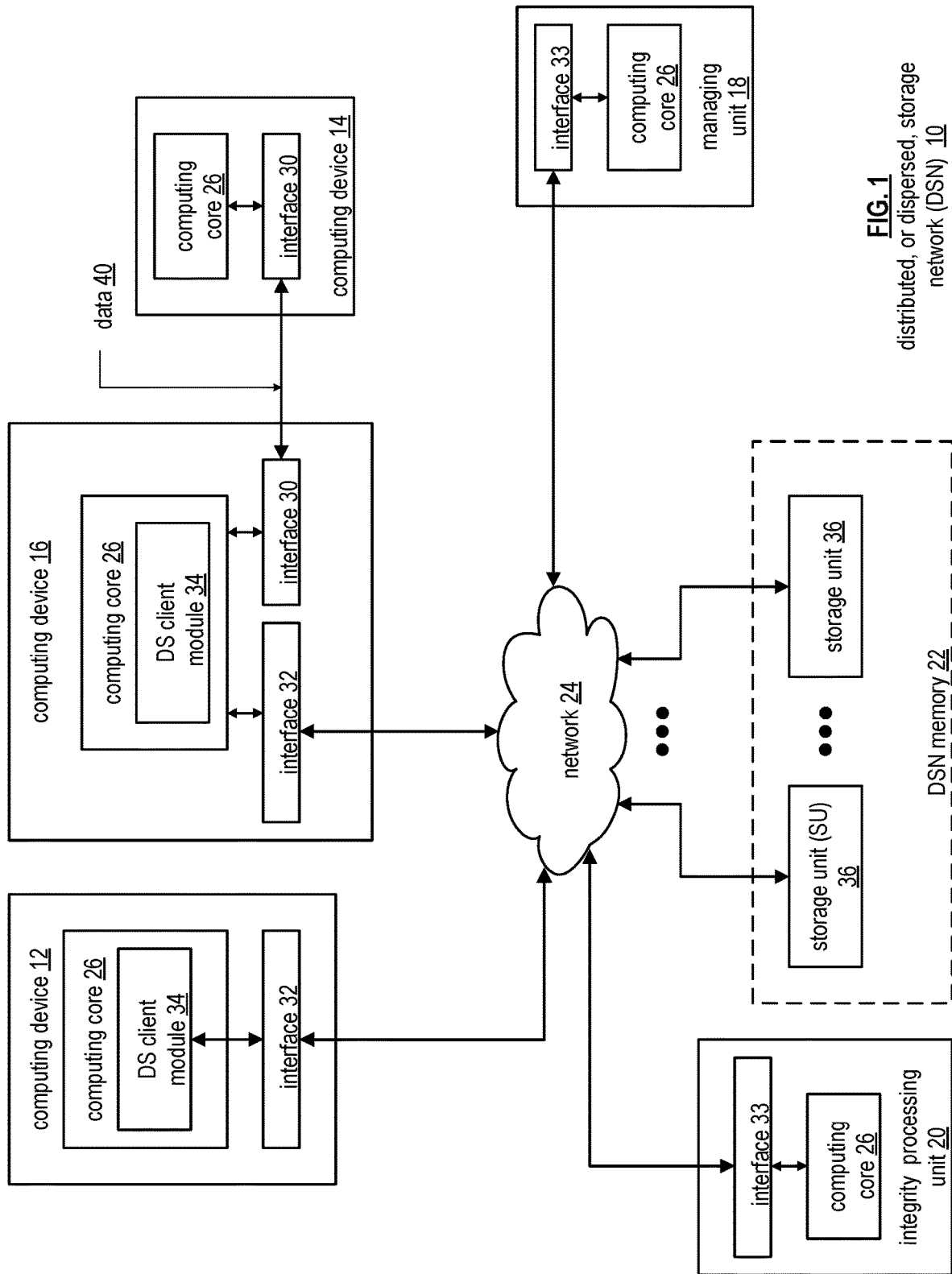
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
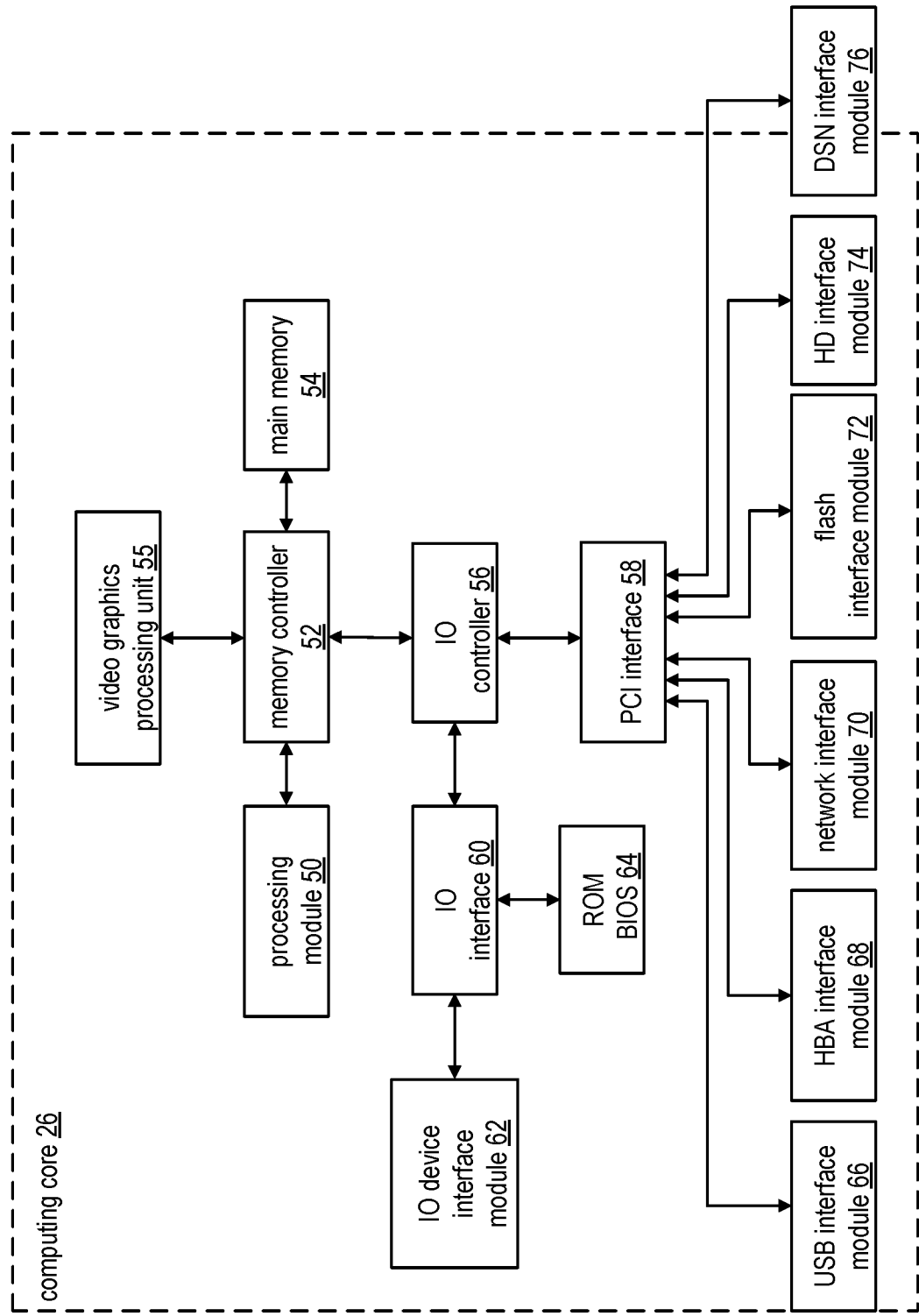
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
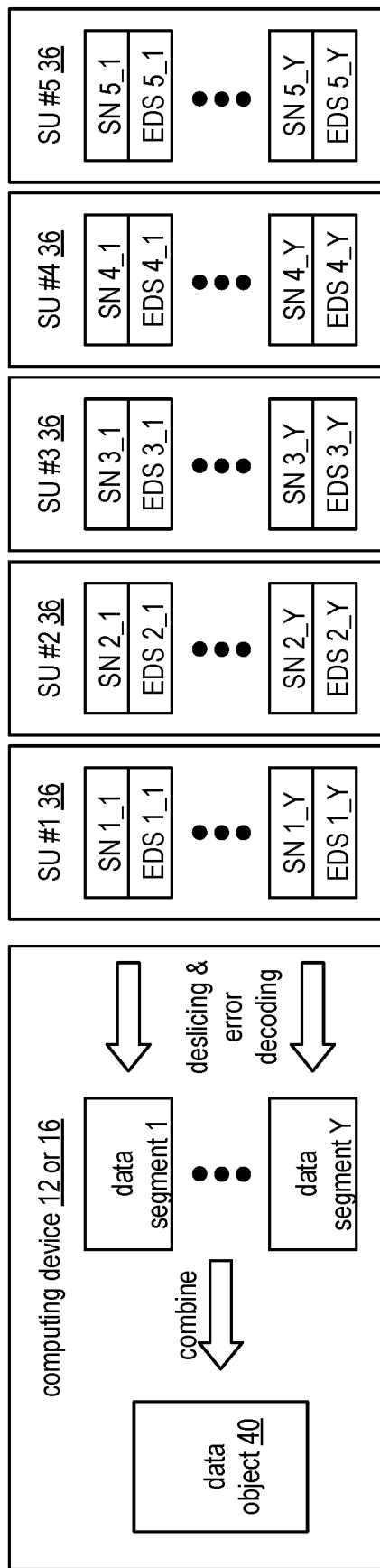
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
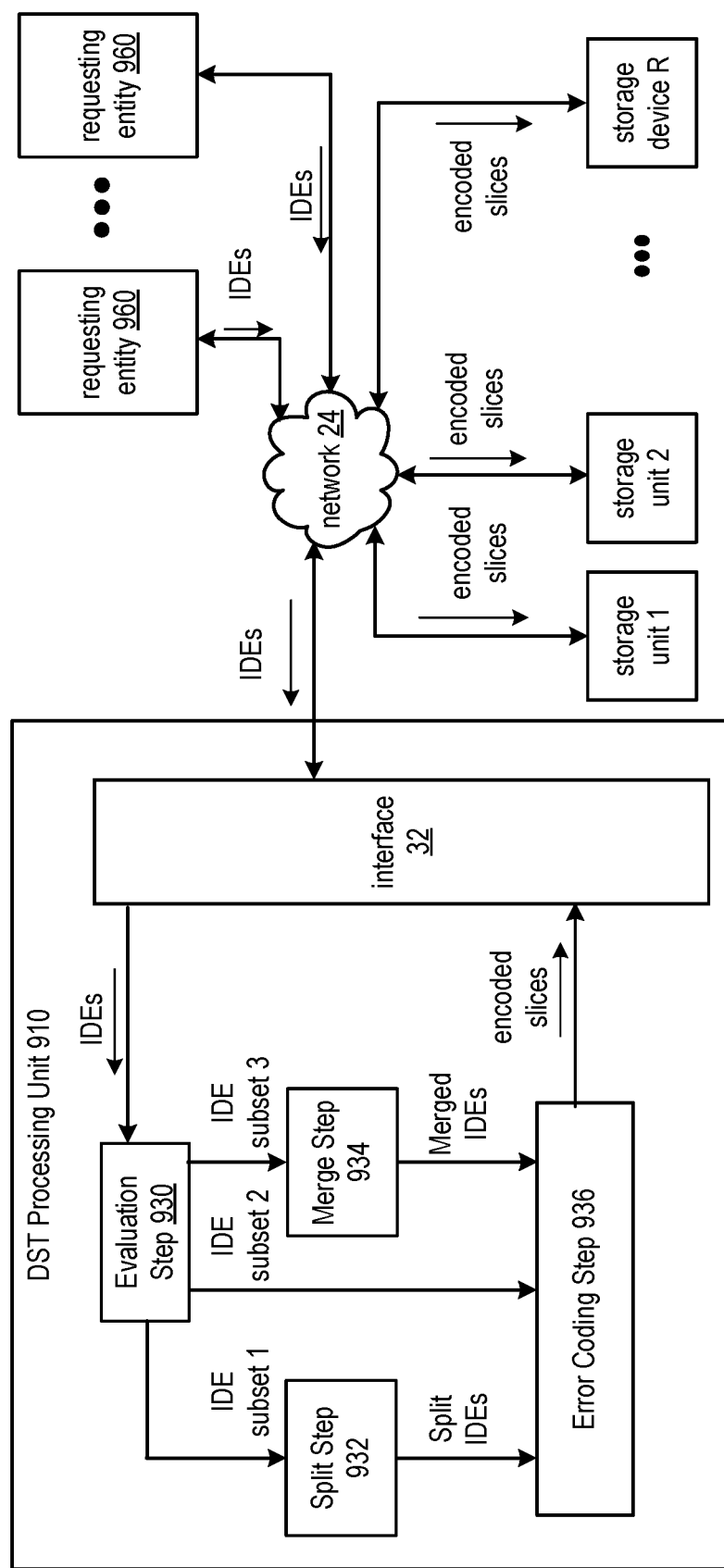
FIG. 9A is a schematic block diagram of an embodiment of a dispersed or distributed storage network (DSN) in accordance with the present invention.

FIG. 9A is a schematic block diagram of another embodiment of a dispersed storage network (DSN) that includes at least one DST processing unit 910, at least one requesting entity 960, and a plurality of storage units 1-R, communicating via network 24 of FIG. 1. The DST processing unit can be implemented utilizing the computing device 16 of FIG. 1, for example, where the computing device 16 functions as a dispersed storage processing agent for computing device 14 and/or for one or more requesting entities 960. The DST processing unit can include the interface 32 of FIG. 1, and while not shown, can include the computing core 26 of FIG. 1, and/or the DS client module 34 of FIG. 1. Each storage unit 1-R can be implemented utilizing the storage unit 36 of FIG. 1, operable to store and/or access encoded data slices of produced by and received from the DST processing unit. Each requesting entity 960 can be implemented utilizing computing device 14 of FIG. 1 or can otherwise include a processor and memory, functioning to send data for storage via the network and/or to send requests to access stored data. The DSN functions to dynamically combine and/or segment the encoded data slices stored in memory of storage units into a form allowing them to be efficiently stored and/or efficiently retrieved from different storage locations.

In the DSN, data is processed by an error coding algorithm, such as erasure coding algorithm, error correcting code, information dispersal algorithm, or other coding algorithm to produce a number of encoded data slices for storage in a set of the storage units 1-R. For example, the error coding algorithm can include the dispersed storage error encoding schemes described herein can be performed on data objects to generate a plurality of data slices, as discussed in conjunction with FIGS. 3-6. A straight forward strategy for encoding data with an error coding algorithm can include encoding an entire "Independent Data Element" or IDE. An IDE can be a file, Blob, data object, data block, a data segment, or a chunk/segment of the aforementioned IDEs. In one example, a IDE can be encoded through the error coding algorithm. However, this can result in some downsides. For example, when the IDE is too large, the time to first byte can be larger than desired, as the full threshold of data must be retrieved before decoding can begin to return the data. Furthermore, the amount of memory required for the error coding algorithm to function on the large IDE may be too high for some devices to handle. Additionally, the slices generated from the large IDE may be too large to be efficiently handled by the storage units responsible for storing the slices. Conversely, when the IDE is too small, a large number of memory device seek operations are required for each access of that IDE. Additionally, per-slice storage overhead can become a significant fraction of the overall storage utilization. Slices may be too small to be efficiently handled by storage units responsible for storing the slices. Slices may be too numerous for the system to efficiently handle, for example, due to a large number of and/or a large amount of metadata to track and list for rebuilding, rebalancing, reallocation or other system maintenance tasks.

To avoid such pitfalls, a DST processing unit can operate to either combine or split elements of independent data, in order to achieve a more optimal slice size. Such splitting and combining operations can be performed at the time of an object write, or can operate in the background after storage of the data as parameters of the system change and the optimum sizes of slices shifts. By achieving the more optimal target slice size for storage, time to first byte and/or memory requirements can be decreased, and further, situations with excessive memory device operations or storage overhead can be avoided.

A DST processing unit can determine an IDE for storage. For example, the IDE can be received as input of a write, can be received in an access request, and/or can otherwise be received via the network. In some embodiments, the IDE is received in response to performing a read of the IDE from the DSN memory, where the set of slices corresponding to a previous write of the IDE are recovered from a decode threshold number of storage units, and where the set of slices are dispersed storage decoded to recover the IDE. In particular, IDEs already stored in memory can be reevaluated, and/or can be retrieved from storage in response to performing a reevaluation and determining that the already-stored IDE be split or merged from its current form.

Once the DST processing unit has acquired an IDE or has identified one or more IDEs stored in memory for re-evaluation, it can determine whether to segment the IDE into multiple IDEs, to combine the IDE with another received IDE, or to keep the IDE in its original form by performing evaluation step 930. This can include determining an optimal slice size for slices of the IDE based on a number of factors that will be discussed in greater detail herein, to provide more optimal and/or efficient storage and/or access of the IDE. This can include determining properties of content of the IDE itself and/or determining conditions and/or requirements across the DSN that have changed, and utilizing these determined factors to dictate an optimal slice size for the IDE. As used herein, optimal slice size can correspond to a single, fixed size or a range of sizes within an optimal slice size minimum and an optimal slice size maximum. A slice adheres to and/or otherwise compares favorably to the optimal slice size requirements if the slice matches the fixed size or is within the fixed range. Similarly, an IDE adheres to and/or otherwise compares favorably to the optimal slice size requirements if the resulting set of slices produced when applying the dispersed storage error encoding function used by the DST processing unit would all match the fixed size or fall within the range of sizes.

The optimal slice size dictates the optimal size of the IDE itself, and vice versa, when the error coding function parameters are known and/or fixed. In particular, optimal size of the IDE, given the optimal slice size, is dictated by on the known the IDA parameters and/or by a known number of slices that will result from encoding the IDE into slices via the selected error coding function. For example, the IDA width parameter, write threshold parameter, read threshold parameter, and/or decode threshold parameter utilized by the dispersed storage error encoding scheme and/or dispersed storage error decoding scheme to encode the IDE into a set of slices and/or to decode at least a subset of the set of slices to recover the IDE can dictate the optimal size of the IDE, given the optimal slice size. In other embodiments, the error coding function parameters are not fixed, and can also be set differently for different IDEs based on desired IDE size requirements and desired slice size requirements.

The DST processing unit can determine to split the IDE in response to determining that the size of slices previously produced by performing the error coding algorithm on the IDE as a whole are larger than the determined optimal slice size and/or are larger than a fixed threshold maximum slice size. Alternatively, the DST processing unit can determine to split the IDE in response to determining that the size of the slices that would result if the error coding algorithm were to be performed on the IDE as a whole are larger than the optimal slice size and/or larger than the threshold maximum slice size, for example, based on the size of the IDE and known properties of the error coding algorithm.

Figure 9C:
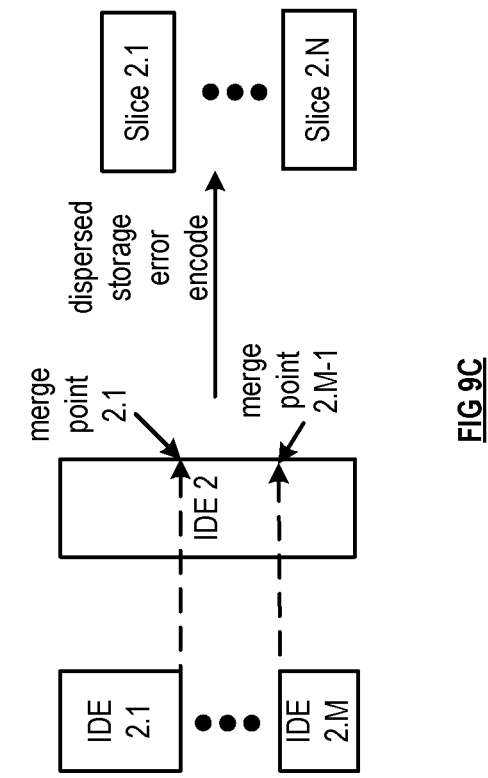
FIG. 9C depicts an example of performing a merge step on data in accordance with various embodiments of the present invention.
Figure 9B:
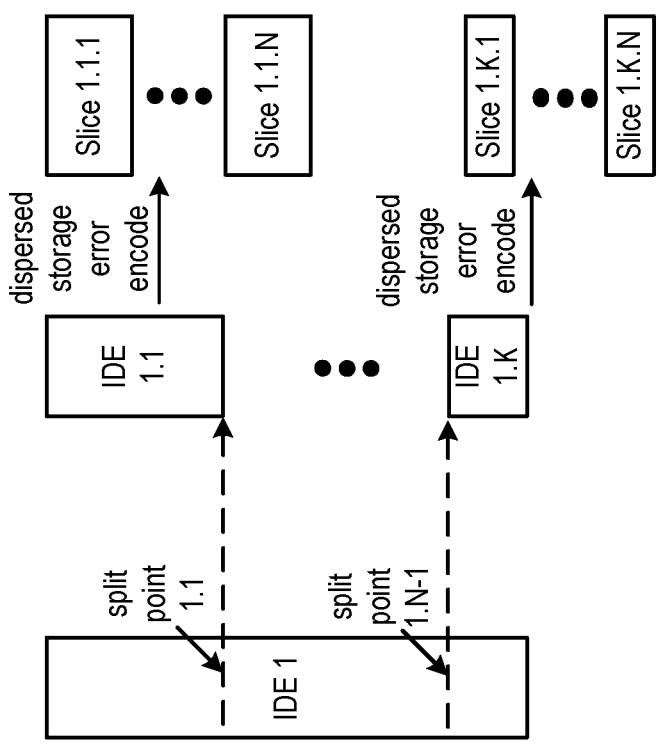
FIG. 9B depicts an example of performing a split step on data in accordance with various embodiments of the present invention.

FIG. 9B illustrates an example of performing split step 932 and error coding step 936. In response to determining to split the IDE, the DST processing unit can select at least one split location upon which to divide continuous ranges of the content of the IDE. The split operation results in more than one IDE being produced, for example, where the original IDE is split into multiple IDEs of continuous portions of content of the original IDE in accordance with the selected split locations. For example, as shown in FIG. 9B, an IDE 1 can be split into a number K IDEs 1.1-1.K, in accordance with a number K-1 determined split locations 1.1-1.K-1. The resulting IDEs 1.1-1.K can be equal-sized or non-equal-sized, continuous portions of content dictated by determined split locations 1.1-1.K-1. The DST processing unit can then encode each resulting IDE from the split operation into slices via the error coding algorithm, and can store the produced set of slices for each IDE in the DSN memory. As shown in FIG. 9B, each IDE 1.1-1.K is dispersed storage error encoded into its own set of N slices, for example, where the number N corresponds to an IDA width of the utilized dispersed error encoding algorithm. Each set of slices of each IDE can be transmitted, via the network, to an IDA width number of storage units, where different sets of slices are sent to the same set of storage units or a different set of storage units of the DSN.

The size of each slice can correspond to the optimal slice size determined for IDE 1, if each IDE 1.1-1.K is of equal size. Alternatively, each IDE 1.1-1.K can be of non-equal size in response to determining different optimal slice sized for the different continuous portions of IDE 1. Thus, each set of resulting slices can be of equal size within its set, for example, where the fixed slice size of slices produced from IDE 1.1 is different from the fixed slice size of slices produced from of IDE 1.K, in accordance with different optimal slice sizes determined for IDE 1.1 and IDE 1.K.

To access the original IDE that was split, the same or different DST processing unit can determine locations for sets of slices of each of the multiple IDEs, for example, by accessing a list of identifiers or other namespace information indicating the original IDE was split into multiple IDEs with respective sets of slices stored in a plurality of memory locations. The DST processing unit can read the original IDE by retrieving a decode threshold number of slices of each of the multiple IDEs from their respective memory locations, and can perform an error decode algorithm, such as a dispersed storage error decoding scheme described herein in conjunction with FIGS. 7-8, to reproduce each of the multiple IDEs. These multiple IDEs can be recombined based on a known ordering and/or based on an indication of an ordering in the multiple IDEs, at their original split points, to reproduce the original IDE.

FIG. 9C illustrates an example of performing merge step 934 and error coding step 936. The DST processing unit can determine to merge and/or combine multiple IDEs in response to determining the size of slices previously produced by performing the error coding algorithm on at least one of the multiple IDEs individually are smaller than the determined optimal slice size and/or smaller than a fixed threshold minimum slice size. Alternatively, the DST processing unit can determine to merge and/or combine multiple IDEs in response to determining that the size of the slices that would result if the error coding algorithm were to be performed on at least one of the multiple IDEs individually would be smaller than the optimal slice size and/or smaller than the threshold minimum slice size, for example, based on the size of the at least one of the multiple IDEs and based on known properties of the error coding algorithm. In some embodiments, the DST processing unit determines a plurality of candidate IDEs for merging based on determining each of the plurality of candidate IDEs would result in slices that are smaller than the optimal size and/or smaller than the threshold minimum slice size. The DST processing unit can further dictate groupings of the plurality of candidate IDEs to be merged together as their own IDEs. For example, the DST processing unit can select a subset of the plurality of candidate IDEs for merging in by selecting two or more candidate IDEs which are segments of the same file or data object and/or two or more objects which are determined to be or expected to be frequently accessed together to be merged in the same IDE. As another example, the DST processing unit can use other heuristics for deciding which IDEs of the plurality of candidate IDEs to combine, such as those written close together in time, or those written by the same requester.

Once in possession of at least two IDEs to combine and/or in response to intelligently selecting and the at least two IDEs from the plurality of candidate IDEs to be combined together, the DST processing unit can merge the least two IDEs into a single IDE. This can include utilizing a byte operation, concatenation, appending, prepending, interlacing, and/or another means of combining the at least two IDEs into a single IDE. The DST processing unit can further select an intelligent ordering for the IDEs in the merge, for example, based on some or all of the factors discussed above. As shown in FIG. 9C, a number M IDEs 2.1-2.M of equal or non-equal size can be selected to be merged into IDE 2 at merge points 2.1-2.M-1. The DST processing unit can then perform the error coding algorithm on this combined IDE to produce a new set of encoded data slices, and can store these encoded data slices to the DSN memory. As shown in FIG. 9C, merged IDE 2 can be dispersed storage error encoded into a set of N slices, for example, where the number N corresponds to an IDA width of the utilized dispersed error encoding algorithm. The slices 2.1-2.N can be of equal size, corresponding to the determined optimal slice size for IDE 2 and/or for individual IDEs 2.1-2.M. The set of slices of the combined IDE can be transmitted, via the network, to an IDA width number of storage units.

To access an original IDE that was merged, the same or different DST processing unit can determine the merged IDE the original IDE belongs to, for example, by accessing a list of identifiers or other namespace information indicating the original IDE was combined into the combined IDE with respective sets of slices stored in a plurality of memory locations. The DST processing unit can read the original IDE by retrieving a decode threshold number of slices of the combined IDE from the plurality of memory locations, and can perform an error decode algorithm, such as a dispersed storage error decoding scheme described herein in conjunction with FIGS. 7-8, to reproduce the combined IDE. The requested, original IDE can then be extracted from the combined IDE based on a known location within the combined IDE, such as a known start point where entire, consecutive data of the original IDE begins within the combined IDE.

If an IDE is split or merged after being written to memory itself, the DST processing unit can clean up previous slices of the original, non-optimal-sized IDE in the DSN, for example, by performing an overwrite or delete operation on these slices. Identifier information for the corresponding data of the original, non-optimal-sized IDE, can be updated to reflect identifier and/or memory location information for the new IDE instead of the old IDE. Alternatively, in some embodiments, it can be beneficial to retain the original IDE segments of the other size, rather than removing them. In particular, if conditions change and the IDE is reverted to the previous size, the corresponding slices already store in memory can be utilized rather than necessitating that the IDE be retrieved from memory, re-combined, and then re-split. In such embodiments, a file or other original data object can be stored as a set of duplicates, where each duplicate corresponds to a different set of multiple IDEs in accordance with different split points, for example, where the different sets of multiple IDEs each correspond to different optimal slice sizes and/or different retrieval efficiency requirements. The DST processing unit can select which set of multiple IDEs will be retrieved based on efficiency requirements for that particular access, based on a priority of the requestor of the particular access, based on current transmission limitations and/or streaming requirements, and/or based on other traffic to the system, dictating which memory locations would be optimal for retrieval.

In some embodiments, the DST processing unit can assign relative weights to different slices, and/or to different individual IDEs or segments of data being merged into a combined IDE and/or being split into multiple IDEs. For example, the relative weights can be based on contents and/or external parameters, such as the source of the data. In one example, in response to determining the source of data is a media server, the DST processing unit can conclude that the corresponding data is audio-visual media, and can be given a first, higher priority weight given to other types of data, such as data determined to be text data. Segment sizes can be dynamically adjusted based on these priorities.

For example, the determined, optimal slice size of an IDE can be determined based on the corresponding weight of the data and/or can be based on one or more types of data of the IDE. In particular, the optimal slice size of an original IDE can be determined as a function of the assigned weight of an original IDE based on the contents and/or data type of the original IDE, and the original IDE can be combined and/or split in accordance with the optimal slice size dictated by the assigned weight. For example, an original IDE can be split into multiple IDEs, where the size of each of the multiple IDEs, dictating how many multiple IDEs will result from the original IDE, is a function of the assigned weight. As another example, an original IDE can be combined with multiple other IDEs, where the size of the combined IDE is a function of the weight of the original IDE and/or the same or different weight of the multiple other IDEs, thus dictating how many IDEs and/or sizes of the IDEs that are selected for combination to meet this desired size of the combined IDE.

Thus, the resulting slices for different IDEs stored in the DSN can be different sizes for different IDEs, based on different, relative weights assigned to different IDEs. Furthermore, the resulting slices for different IDEs stored in the DSN can dynamically change as relative weights change as new data is added or system parameters change, where existing IDEs in memory are further split and/or merged over time to adapt to the dynamically changing weights, resulting in larger or smaller slices and/or resulting in more or fewer slices. For example, the weight for a particular IDE can lower, thus changing its corresponding optimal slice size, in response to other higher priority data being added to the system. The IDE can be identified to split and/or combined to achieve the new optimal slice size in response to its weight changing.

In some embodiments, the optimal slice size can be determined to be a larger size for audio-visual media and can be determined to be a smaller size for text, or vice versa. In response to selecting this optimal slice size, which thus dictates the optimal size of the IDE as a whole, the IDE can be combined and/or split according to this determined optimal slice size. For example, multiple IDEs can be selected for combination to meet this optimal size, for example, where the multiple IDEs are selected because they store the same type of data corresponding to the weight dictating the optimal slice size. As another example, an IDE can be split into multiple IDE segments that meet this optimal size.

In some embodiments, the decision for choosing an optimal split IDE size or split location for an IDE is made at a periodic time, for example, where IDEs currently stored in memory are evaluated for splitting and/or merging in predetermined time-interval. Alternatively or in addition, the optimal IDE split size and/or split locations can be determined by the DST processing system upon initial ingestion of the original data, for example, at a write time, corresponding to the time that the complete, original IDE, corresponding to an original data file or other complete original data, is first received by the DST processing unit for storage. For example, the DST processing unit can determine the optimal IDE split size and/or split locations for this original data based on determining the content of the data, determining a source of the data, determining a type of the data, determining a priority of the data, determining a relative weight of the data, and/or determining current system parameters.

In some embodiments, the DST processing unit can consider access patterns and time-to-first byte requirements in determining optimal slice size. This can include utilizing a "ramp" segmentation scheme, where the initial split IDEs of a data object are of a smaller size, and gradually increase in size across the length of data object. In particular, the size of IDEs across subsequent split points from the beginning of the continuous content of a file to the end of the continuous content of the file can strictly increase and/or can be non-decreasing in accordance with a determined increasing function and/or a determined non-decreasing function. This can be ideal for a large file that will be streamed when accessed, such as audio-visual media.

For example, the DST processing unit can facilitate streaming of large files. The large files can be split into multiple IDEs as discussed herein, and the large file can be streamed by retrieving the slices of consecutive IDEs of the file, one at a time, for decoding. Each decoded consecutive IDE can be transmitted to a requesting entity as they are received and decoded. For example, as the individual consecutive IDEs of a large audio and/or video file are received by the requesting entity from the DST processing unit, the requesting entity can utilize an audio and/or video processing device to enable playback of the audio and/or video content of the file via a display device and/or via at least one speaker. The DST processing unit and/or the requesting entity can buffer subsequent IDEs that are decoded and received, but not yet ready to be played back due to current playback of content of a previous IDE.

In such embodiments, to access the entire large file, small-sized IDE splits that are the beginning of the data object, corresponding to the first portion of the data object for streaming, will be accessed first. These small-size IDE splits at the beginning of the data object permit a low access time, which can be ideal to more quickly begin streaming data. The larger-size IDE splits that persist towards the latter portions of the data object will take longer to access, but as the data object is being streamed, can begin filling a buffer in the background. In particular, the DST processing unit or other computing device responsible for streaming the data can fill a buffer in its memory in the background by reading future segments of the file as the IDEs of the large file are being received and decoded. In such embodiments, a bottleneck persists, corresponding to a maximum transmission rate of the data in the large data object and/or a playback rate of data corresponding to streaming audio-visual media. Such a bottleneck enables the longer reading time of the larger sizes towards the end portions of the data, with buffering of future portions of the data in the background, while ensuring that the transmission rate of the data or the playback rate of the data is not negatively and/or noticeably affected.

In such embodiments, a known transmission rate and/or known playback rate of data, in conjunction with a known buffer size and/or known read rates to the buffer as a function of slice size, can be utilized to optimize or otherwise the ramped sizing of the IDE across the large data object. For example, the split locations can be optimally determined to utilize the largest possible IDE sizes across the length of the data object, while ensuring that transmission rate and/or playback rate remains the bottleneck over the read rate of the slices when the data object is streamed and/or otherwise accessed under normal conditions, and thus helping to ensure that the transmission rate and/or playback rate will not be affected when the data object is accessed.

The DST processing unit can further utilize formatting data to determine IDE split locations and/or optimal slice sizes. For example, quality, bit rate, resolution, and/or fidelity corresponding to video data, audio data, or other rich media content can be utilized to determine the IDE split locations. In particular, the IDE split locations can be selected to have a targeted time interval worth of content, for example, to meet the streaming requirements as discussed above, and/or to otherwise facilitate consistent playback and/or streaming of the data as it is accessed, regardless of quality. As a particular example, the IDE split locations of a video file can be selected to each contain 2 seconds worth of video, regardless of whether the IDE is a high or low resolution form, or a high bit rate or low bit rate form. Thus, higher quality portions of a video may be split into a larger IDEs and lower quality portions of the video may be split into smaller IDEs to accommodate the targeted time interval.

In some embodiments, the DST processing unit determines optimal slice size for an IDE based on the type of media on which the slices will be stored. The DST processing unit can determine a set of memory devices where the slices of an IDE are currently stored and/or will be stored. Optimal slice size of the IDE can be determined based on the types of the memory devices, efficiency of random access patterns of the memory devices, known and/or expected latency of access of data stored in the memory devices, throughput of access to data stored in the memory devices, and/or other access characteristics and/or properties of the memory devices. The optimal slice size can be selected to enable a most efficient access, given some or all of these properties of the set of memory devices in which the slices are and/or will be stored. For example, the optimal slice size can be a function of a required and/or desired access time for the slices from memory, as well as some or all of these characteristics of the storage medium where the slices will be stored, to help ensure that the selected size of the slices results in the required and/or desired access time based on the memory properties.

In some embodiments, when periodically evaluating the optimal split size for currently stored IDEs, the DST processing unit can consider the recent or historical access patterns for that IDE in question to determine optimal slice size. If the IDE is infrequently accessed, for example, comparing favorably to an infrequent access threshold, the DST processing unit can determine a different action or no action at all. Likewise, if the IDE is frequently accessed, for example, comparing favorably to a frequent access threshold, the DST processing unit can determine to adjust its split locations to assist in that frequent access.

For example, the DST processing unit can determine the new split locations based on reevaluating an optimal slice size, across the entire IDE and/or in accordance with the ramping segmentation scheme based on this frequent access. For example, the DST processing unit can determine to decrease the slice size and/split the IDE into a larger number of IDEs for storage in response to determining the access frequency has increased and/or in response to determining the access frequency compares favorably to the frequent access threshold. Similarly, the, the DST processing unit can determine to increase the slice size and/split the IDE into a fewer number of IDEs for storage in response to determining the access frequency has decreased and/or in response to determining the access frequency compares favorably to the infrequent access threshold.

In either case the DST processing unit can facilitate splitting of the IDE in accordance with the new split locations by re-combining the original IDE from its currently split, multiple IDEs by fetching and/or decoding the multiple IDEs from memory. The DST processing unit can then re-split the recombined IDE utilizing the new split locations, where the new set of multiple IDEs are stored in memory of the DSN and/or where the previous set of multiple IDEs are deleted from memory of the DSN.

In other embodiments, when the optimal slice size decreases, for example, due to access frequency increasing, existing, already-split multiple IDEs of the original IDE can be split themselves, without the need to re-combine and re-split the entire IDE. Similarly, when the optimal slice size increases, for example, due to access frequency decreasing, groups of consecutive ones of existing, already-split multiple IDEs of the original IDE can be identified and combined themselves, without the need to re-combine and re-split the entire IDE.

In addition to system properties, the DST processing unit can utilize requester-supplied hints and/or requirements about the properties of the data to determine and/or re-evaluate optimal slice size. For example, time to first byte expectations and/or requirements, access frequency expectations, tiering information, or other requirements can be received from a requesting entity that requests access to an IDE and/or corresponds to the source of the IDE. These requirements can be different for different requestors and/or sources and can be utilized to set different optimal slice requirements for the different IDEs accordingly. Furthermore, the requirements can be determined based on priorities and/or weights assigned to the different users, requestors, and/or sources themselves, for example, where IDEs requested by and/or sourced by a higher priority requestor and/or higher priority user are optimally sized to provide more efficient access than other IDEs requested by and/or sourced by a lower priority requestor and/or lower priority user.

In embodiments discussed, the DST processing unit changes split locations and/or optimal slice sizes of one or more IDEs by performing some or all of the following steps: retrieving the slices of the IDEs from a plurality of storage units via the network; decoding the sets of slices to reproduce the IDEs; remerge multiple IDEs into their original form or split a merged IDE into its original IDES; re-split and/or re-merge the recovered IDEs; error encoding the re-split or re-merged IDEs into sets of slices; sending the sets of slices to the same or different set of storage units for storage via the network; and/or sending instructions to delete the previously stored slices of the prior IDEs to the set of storage units via the network. However, in other embodiments, storage units can perform merges and/or splits themselves in accordance with optimal slice size changes for IDEs determined by the DST processing unit. In such embodiments, the IDEs can be re-split and re-merged by storage units performing such operations on its stored slices, alleviating the DST processing unit from having to perform this retrieval, decoding, re-encoding, and transmission of slices.

In such embodiments, when a split or merge is determined to be performed on an IDE already stored in memory as a set of slices, these splits or merges can be performed on individual slices of the IDE themselves. For example, an individual storage unit storing a subset of slices of a set of slices of an IDE can perform a merge or split on its own stored slices of the IDE, in response to a request transmitted by the DST processing unit. The storage units can utilize their own processor and/or memory, such as their own computing core 26, to facilitate performing their own merges and splits of their stored slices. In this fashion, the DST processing unit can facilitate a merge or splitting of an IDE already stored in memory by transmitting instructions to the storage units that currently store the slices to perform the corresponding splits on merges on their slices of the IDE.

In this mode of operation, the DST processing unit can facilitate performance of a split of an IDE by sending, to some or all storage units storing slices of the IDE, a request that indicates one slice name and the splits of the slice, for example as at least two new triples of (new slice name, new slice revision, split start location, split end location). The storage unit will process the given slice name, and form at least two new slices from the given slice using the provided new slice name, new revision, and the offset locations for the content taken from the one slice name. To perform future reads of the IDE, the DST processing unit can retrieve all of these split slices of original slice from the set of storage units, can merge the split slices into the original slices itself, and can dispersed storage error decode the recovered slices to reproduce the IDE. Alternatively, in response to a read request for an original slice, the storage unit, having retained knowledge of the original slice name mapped to the new slices, can merge the multiple new slices itself to reproduce the original slice, and can send the original slice back to the DST processing unit. The DST processing unit can thus read an IDE by retrieves these original slices, reproduced by the storage units, from the set of storage units for dispersed storage error decoding into the IDE.

The DST processing unit can facilitate performance of a merge of an IDE in this mode of operation by transmitting, to some or all storage units storing multiple slices of the IDE, at least two slice names to merge, a new slice name, and/or a new slice revision. The storage unit can take the list of slice names, read their content, and form a new concatenation of their slice content. The storage unit can then form a new slice from that concatenation with the given new slice name and new slice revision.

In various embodiments, a processing system of a dispersed storage and task (DST) processing unit includes at least one processor and a memory that stores operational instructions, that when executed by the at least one processor cause the processing system to receive a first independent data element (IDE) for storage. A first optimal slice size requirement is determined for the first IDE, and the DST processing unit determines to split the first IDE based on determining the first IDE compares unfavorably to the first optimal slice size requirement. At least one split location of the first IDE is selected based on the first optimal slice size requirement, and continuous content of the first IDE is split into a first plurality of IDEs in accordance with the at least one split location. A dispersed storage error coding function is performed on each of the first plurality of IDEs to produce a set of encoded slices for each of the first plurality of IDEs, where encoded slices of each set of encoded slices compare favorably to the first optimal slice size requirement. Each set of encoded slices are transmitted, via a network, to a corresponding set of storage units for storage. Each set of storage units can be the same or different for each set of encoded slices.

Alternatively or in addition, the memory of the DST processing unit stores operational instructions, that when executed by the at least one processor of the DST processing unit, cause the processing system to receive a set of additional IDEs for storage. A second optimal slice size requirement is determined for at least one of the set of additional IDEs and/or for all of the set of additional IDEs, for example, where the second optimal slice size requirement is the same or different for all of the set of additional IDEs. The DST processing unit determines to merge the set of additional IDEs into at least one merged IDE based on determining the set of additional IDEs compare unfavorably to the second optimal slice size requirement. A subset of the set of additional IDEs are selected to be merged into a merged IDE based on the second optimal slice size requirement, and continuous content of the subset of the set of additional IDEs is concatenated to produce the merged IDE. The dispersed storage error coding function is performed on the merged IDE to produce a second set of encoded slices for the merged IDE, where encoded slices of the second set of encoded slices compare favorably to the second optimal slice size requirement. The second set of encoded slices are transmitted, via the network to a second corresponding set of storage units for storage.

Figure 10A:
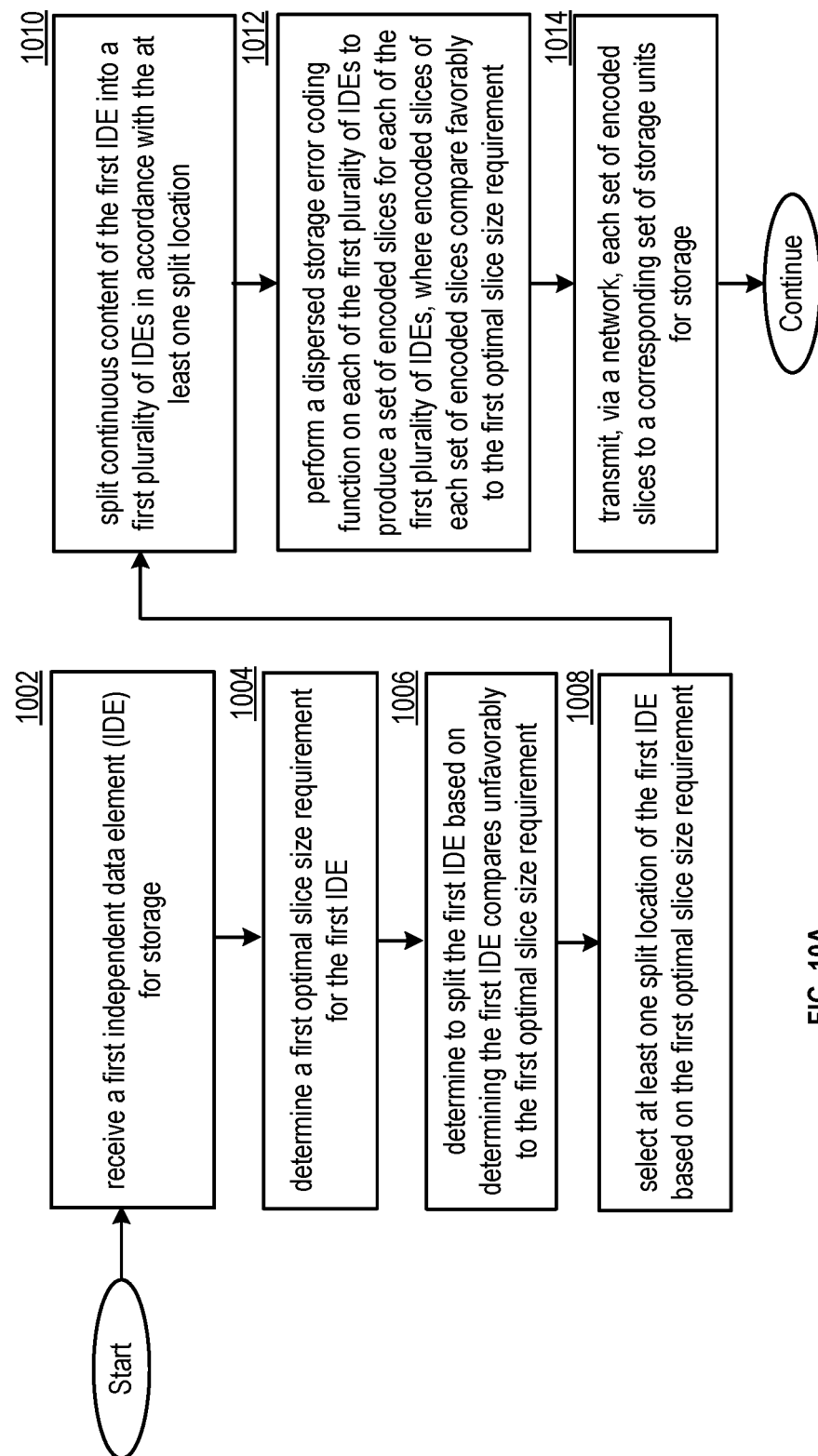
FIG. 10A is a logic diagram of an example of a method of segmenting data in accordance with the present invention.

FIG. 10A is a flowchart illustrating an example of segmenting data. In particular, a method is presented for use in association with one or more functions and features described in conjunction with FIGS. 1-9C, for execution by a dispersed storage and task (DST) processing unit that includes a processor or via another processing system of a dispersed storage network that includes at least one processor and memory that stores instruction that configure the processor or processors to perform the steps described below.

Step 1002 includes receiving a first independent data element (IDE) for storage. Step 1004 includes determining a first optimal slice size requirement for the first IDE. Step 1006 includes determining to split the first IDE based on determining the first IDE compares unfavorably to the first optimal slice size requirement. Step 1008 includes selecting at least one split location of the first IDE based on the first optimal slice size requirement. Step 1010 includes splitting continuous content of the first IDE into a first plurality of IDEs in accordance with the at least one split location. Step 1012 includes performing a dispersed storage error coding function on each of the first plurality of IDEs to produce a set of encoded slices for each of the first plurality of IDEs, where encoded slices of each set of encoded slices compare favorably to the first optimal slice size requirement. Step 1014 includes transmitting, via a network, each set of encoded slices to a corresponding set of storage units for storage.

Figure 10B:
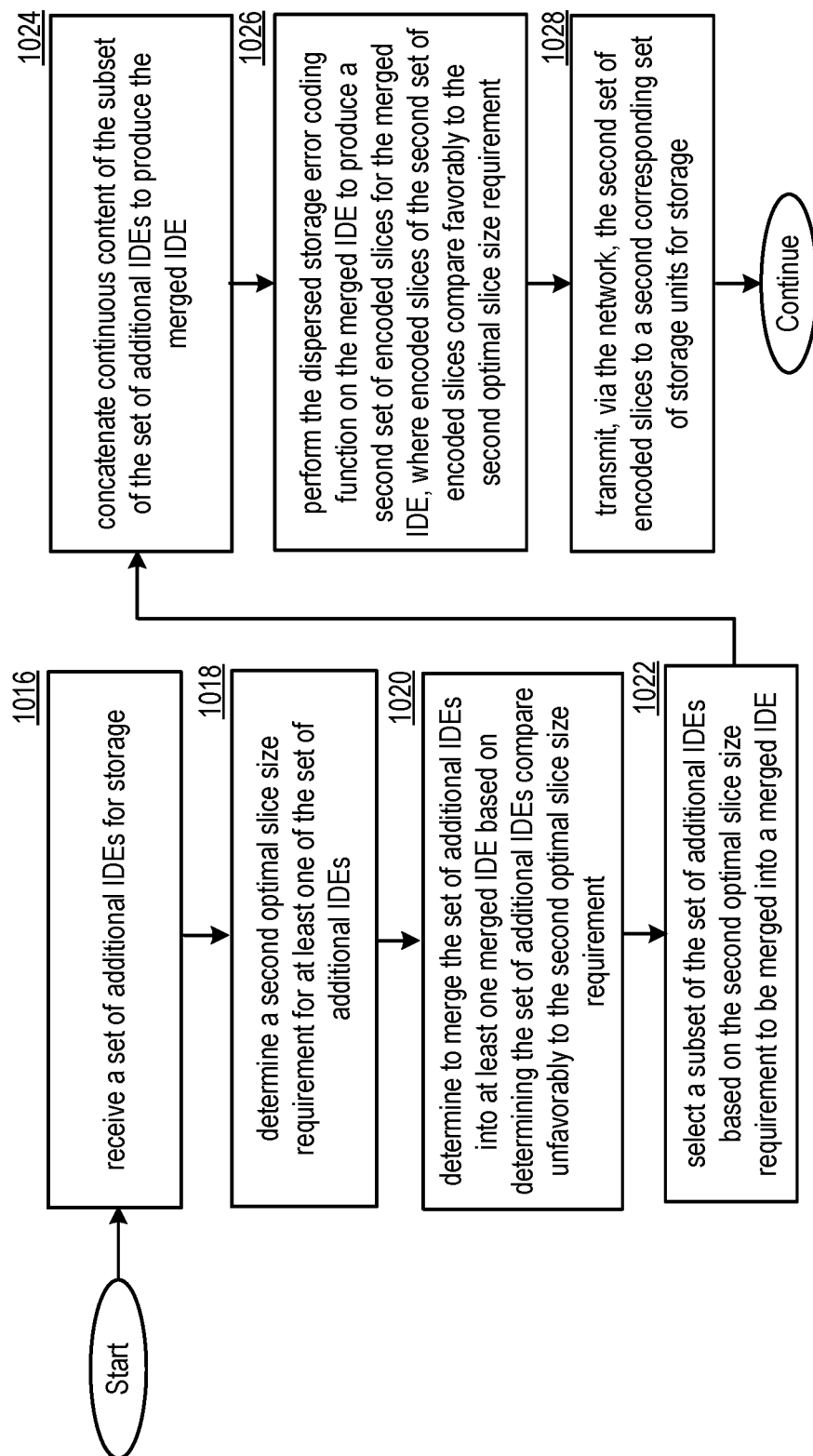
FIG. 10B is a logic diagram of an example of a method of merging data in accordance with the present invention.

FIG. 10B is a flowchart illustrating an example of merging data. In particular, a method is presented for use in association with one or more functions and features described in conjunction with FIGS. 1-9C, for execution by a dispersed storage and task (DST) processing unit that includes a processor or via another processing system of a dispersed storage network that includes at least one processor and memory that stores instruction that configure the processor or processors to perform the steps described below. The DST processing unit can perform some or all of the steps of FIG. 10B instead of or in addition to some or all of the steps of FIG. 10A.

Step 1016 includes receiving a set of additional IDEs for storage. Step 1018 includes determining a second optimal slice size requirement for at least one of the set of additional IDEs. Step 1020 includes determining to merge the set of additional IDEs into at least one merged IDE based on determining the set of additional IDEs compare unfavorably to the second optimal slice size requirement. Step 1022 includes selecting a subset of the set of additional IDEs based on the second optimal slice size requirement to be merged into a merged IDE. Step 1024 includes concatenating continuous content of the subset of the set of additional IDEs to produce the merged IDE. Step 1026 includes performing the dispersed storage error coding function on the merged IDE to produce a second set of encoded slices for the merged IDE, where encoded slices of the second set of encoded slices compare favorably to the second optimal slice size requirement. Step 1028 includes transmitting, via the network, the second set of encoded slices to a second corresponding set of storage units for storage.

In various embodiments, a second subset of the set of additional IDEs are selected to be merged into a second merged IDE, where the subset of the set of additional IDEs and the second subset of the set of additional IDEs are mutually exclusive. Continuous content of the second subset of the set of additional IDEs is concatenated to produce the second merged IDE. The dispersed storage error coding function is performed on the second merged IDE to produce a third set of encoded slices for the second merged IDE, where encoded slices of the third set of encoded slices compare favorably to the second optimal slice size requirement. The third set of encoded slices are transmitted, via the network, to a third corresponding set of storage units for storage, which can be the same or different from the second set of storage units storing encoded slices of the merged IDE discussed above.

In various embodiments, a second IDE is received for storage. A third optimal slice size requirement is determined for the second IDE, where the third optimal slice size requirement indicates a smaller optimal slice size than the first optimal slice size requirement. The DST processing unit determines to split the second IDE based on determining the second IDE compares unfavorably to the third optimal slice size requirement. At least one split location of the second IDE is selected based on the third optimal slice size requirement. Continuous content of the second IDE is split into a second plurality of IDEs in accordance with the at least one split location of the second IDE. The second plurality of IDEs are smaller than the first plurality of IDEs in response to the third optimal slice size requirement indicating the smaller optimal slice size than the first optimal slice size requirement.

The dispersed storage error coding function is performed on each of the second plurality of IDEs to produce a set of encoded slices for each of the second plurality of IDEs. Encoded slices of each set of encoded slices for each of the second plurality of IDEs compare favorably to the third optimal slice size requirement, and encoded slices of each set of encoded slices for each of the second plurality of IDEs are smaller than encoded slices of each set of encoded slices for each of the first plurality of IDEs in response to the third optimal slice size requirement indicating the smaller optimal slice size than the first optimal slice size requirement. Each set of encoded slices for each of the second plurality of IDEs are transmitted, via the network, to a third corresponding set of storage units for storage. These sets of storage units can be the same or different from some or all of the sets of storage units storing the first plurality of IDEs.

In various embodiments, the third optimal slice size requirement indicates a smaller optimal slice size than the first optimal slice size requirement in response to determining the second IDE has a higher access frequency than the first IDE. In various embodiments, the third optimal slice size requirement indicates a smaller optimal slice size than the first optimal slice size requirement in response to determining that a first requesting entity that requests access to the first IDE has a lower priority than a second requesting entity that requests access to the second IDE.

In various embodiments, the first optimal slice size requirement indicates a first optimal slice size for a first portion of the continuous content, and the first optimal slice size requirement indicates a second optimal slice size for a second portion of the continuous content. The second optimal slice size is different from the first optimal slice size. The at least one split location of the first IDE is selected to separate the first portion of the continuous content from the second portion of the continuous content. A first one of the first plurality of IDEs corresponds to the first portion of the continuous content, and a second one of the first plurality of IDEs corresponds to the second portion of the continuous content. A first size of each encoded slice of a first set of encoded slices produced for the first one of the first plurality of IDEs is different from a second size of each encoded slice of a second set of encoded slices produced for the second one of the first plurality of IDEs in response to the first optimal slice size requirement indicating the first optimal slice size for the first portion of the continuous content and indicating the second optimal slice size for the second portion of the continuous content.

In various embodiments, the continuous content of the first IDE corresponds to video content. The first portion of the continuous content corresponds to a first quality of the video content. The second portion of the continuous content corresponds to a second quality of the video content that is higher than the first quality. The first optimal slice size requirement is selected based on a targeted time interval of the video content, where the at least one split location of the first IDE is selected such that the first plurality of IDEs compare favorably to the targeted time interval. The first size of each encoded slice of the first set of encoded slices produced for the first one of the first plurality of IDEs is smaller than the second size of each encoded slice of a second set of encoded slices produced for the second one of the first plurality of IDEs in response to the second portion having the second quality that is higher than the first quality of the first portion.

In various embodiments, the continuous content of the first IDE corresponds to video content. The first portion of the continuous content corresponds to a first continuous interval of the video content, and the second portion of the continuous content corresponds to a second continuous interval of the video content that is strictly after the first continuous interval. The first optimal slice size requirement is selected based on a ramping segmentation scheme, where the at least one split location of the first IDE is selected such that the first plurality of IDEs adhere to the ramping segmentation scheme. The first size of each encoded slice of the first set of encoded slices produced for the first one of the first plurality of IDEs is smaller than the second size of each encoded slice of a second set of encoded slices produced for the second one of the first plurality of IDEs in response to the second continuous interval of the video content being strictly after the first continuous interval.

In various embodiments, consecutive ones of the first plurality of IDEs increase in size in accordance with a non-decreasing function of the ramping segmentation scheme. In various embodiments, at least one rate of increase in consecutive ones of the first plurality of IDEs is determined based on at least one of: a transmission rate or a playback rate of content of the first IDE.

In various embodiments, a plurality of requests are generated for transmission to a set of storage units for a set of currently stored encoded slices of the first IDE in response to determining current storage of the first IDE compares unfavorably to the first optimal slice size requirement. The first IDE is received as the set of currently stored encoded slices in response to the plurality of requests. The first IDE is reproduced by performing a dispersed storage error decoding function on the set of currently stored encoded slices, where the continuous content of the reproduced first IDE is split into the first plurality of IDEs in accordance with the at least one split location. A plurality of requests to delete the set of currently stored encoded slices are generated for transmission to the set of storage units in response to determining the each set of encoded slices produced for the first plurality of IDEs have been stored successfully.

In various embodiments, an updated first optimal slice size requirement is determined for the first IDE. The DST processing unit determines to further split the first IDE based on the updated first optimal slice size requirement. A plurality of requests are transmitted via the network, where each of the plurality of requests indicates an encoded slice of the each set of encoded slices of the first plurality of IDEs of the first IDE, and each of the plurality of requests is transmitted to a storage unit storing the encoded slice. Each of the plurality of requests further indicates at least one slice split location for the encoded slice based on the updated first optimal slice size requirement, and each storage unit facilitates splitting of the encoded slice indicated in the each of the plurality of requests in accordance with the at least one slice split location for the encoded slice indicated in the each of the plurality of requests. Some or all of this set of operations enabling storage units to split their stored slices can similarly be performed for slices of the merged IDE in response to updated optimal slice size requirements for the merged IDE.

In various embodiments, an updated second optimal slice size requirement is determined for the merged IDE. The DST processing unit determines to further merge the merged IDE with another IDE stored in the second set of storage units based on the updated second optimal slice size requirement. A plurality of requests are transmitted via the network, where each of the plurality of requests indicates an encoded slice of the merged IDE and further indicates an encoded slice of the another IDE. Each of the plurality of requests is transmitted to a storage unit of the second set of storage units storing the encoded slice of the merged IDE and the encoded slice of the another IDE. Each storage unit facilitates merging of the encoded slice of the merged IDE with the encoded slice of the another IDE as indicated in the each of the plurality of requests. Some or all of this set of operations enabling storage units to merge their stored slices can similarly be performed for slices of the first IDE with another IDE in response to updated optimal slice size requirements for the first IDE.

In various embodiments, a non-transitory computer readable storage medium includes at least one memory section that stores operational instructions that, when executed by a processing system of a dispersed storage network (DSN) that includes a processor and a memory, causes the processing system to receive a first independent data element (IDE) for storage. A first optimal slice size requirement is determined for the first IDE. The first IDE is determined to be split based on determining the first IDE compares unfavorably to the first optimal slice size requirement. At least one split location of the first IDE is selected based on the first optimal slice size requirement, and continuous content of the first IDE is split into a first plurality of IDEs in accordance with the at least one split location. A dispersed storage error coding function is performed on each of the first plurality of IDEs to produce a set of encoded slices for each of the first plurality of IDEs, where encoded slices of each set of encoded slices compare favorably to the first optimal slice size requirement. Each set of encoded slices are transmitted, via a network, to a corresponding set of storage units for storage.

Alternatively or in addition, the operational instructions of the at least one memory section of the non-transitory computer readable storage medium, when executed by the processing system of a dispersed storage network (DSN) that includes a processor and a memory, cause the processing system to receive a set of additional IDEs for storage. A second optimal slice size requirement is determined for at least one of the set of additional IDEs and/or for all of the set of additional IDEs. It is determined to merge the set of additional IDEs into at least one merged IDE based on determining the set of additional IDEs compare unfavorably to the second optimal slice size requirement. A subset of the set of additional IDEs are selected to be merged into a merged IDE based on the second optimal slice size requirement, and continuous content of the subset of the set of additional IDEs is concatenated to produce the merged IDE. The dispersed storage error coding function is performed on the merged IDE to produce a second set of encoded slices for the merged IDE, where encoded slices of the second set of encoded slices compare favorably to the second optimal slice size requirement. The second set of encoded slices are transmitted, via the network to a second corresponding set of storage units for storage.

Figure 11:
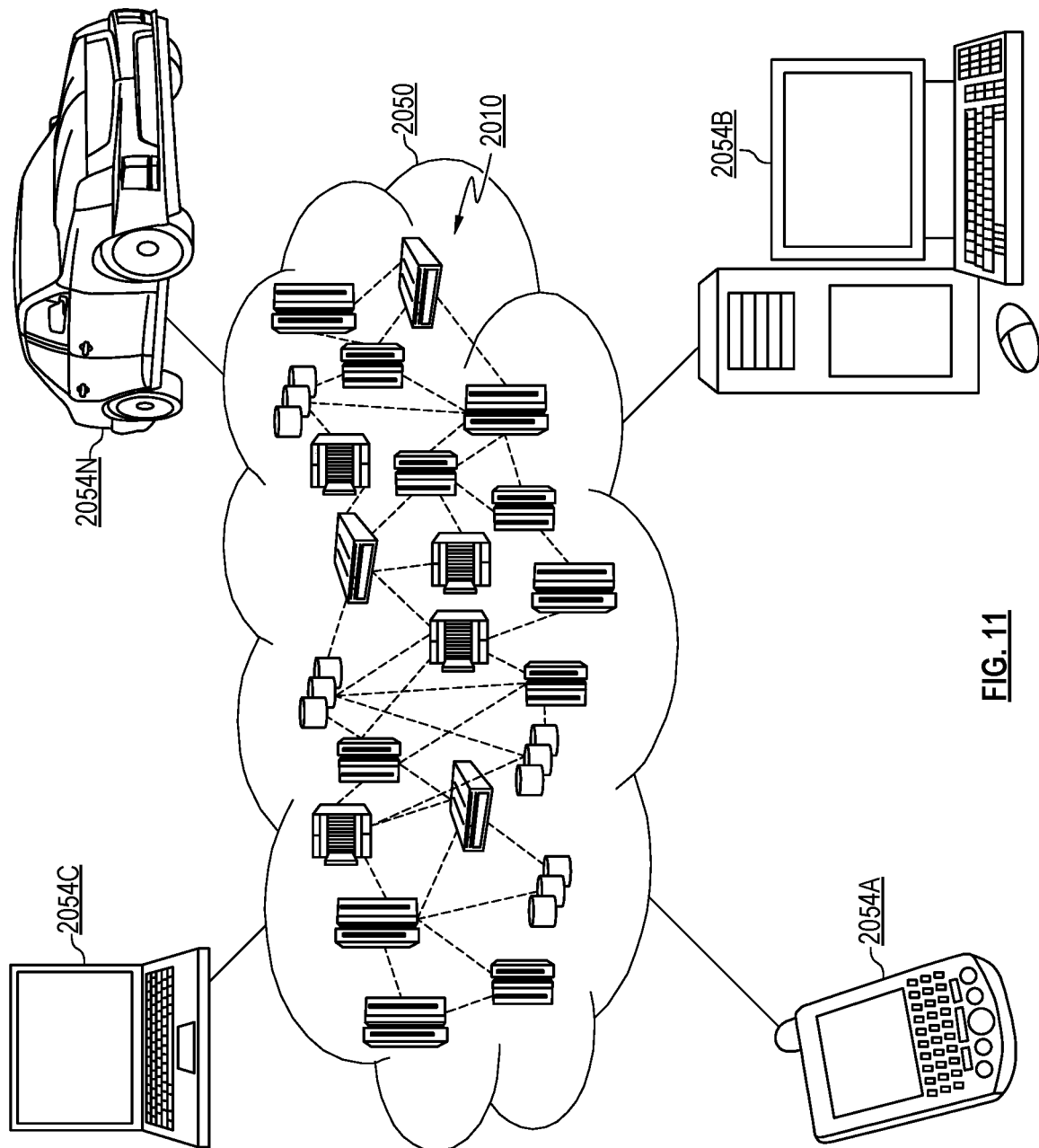
FIG. 11 depicts a cloud computing environment according to an embodiment of the present invention.

FIG. 11 presents an illustrative cloud computing environment 2050. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 11 are intended to be illustrative only and that computing nodes 2010 and cloud computing environment 2050 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

In various embodiments, the DSN can be implemented by utilizing the cloud computing environment 2050 and/or can communicate with cloud computing environment 2050. Alternatively or in addition, the plurality of computing devices 12-16 of FIG. 1, the managing unit of FIG. 1, and/or the integrity processing unit 20 of FIG. 1, and/or storage units 36 can be implemented by utilizing cloud computing nodes 2010, personal digital assistant (PDA) or cellular telephone 2054A, desktop computer 2054B, laptop computer 2054C, and/or automobile computer system 2054N. In various embodiments, the cloud computing nodes 2010, personal digital assistant (PDA) or cellular telephone 2054A, desktop computer 2054B, laptop computer 2054C, and/or automobile computer system 2054N can communicate by utilizing network 24 of FIG. 1.

Figure 12:
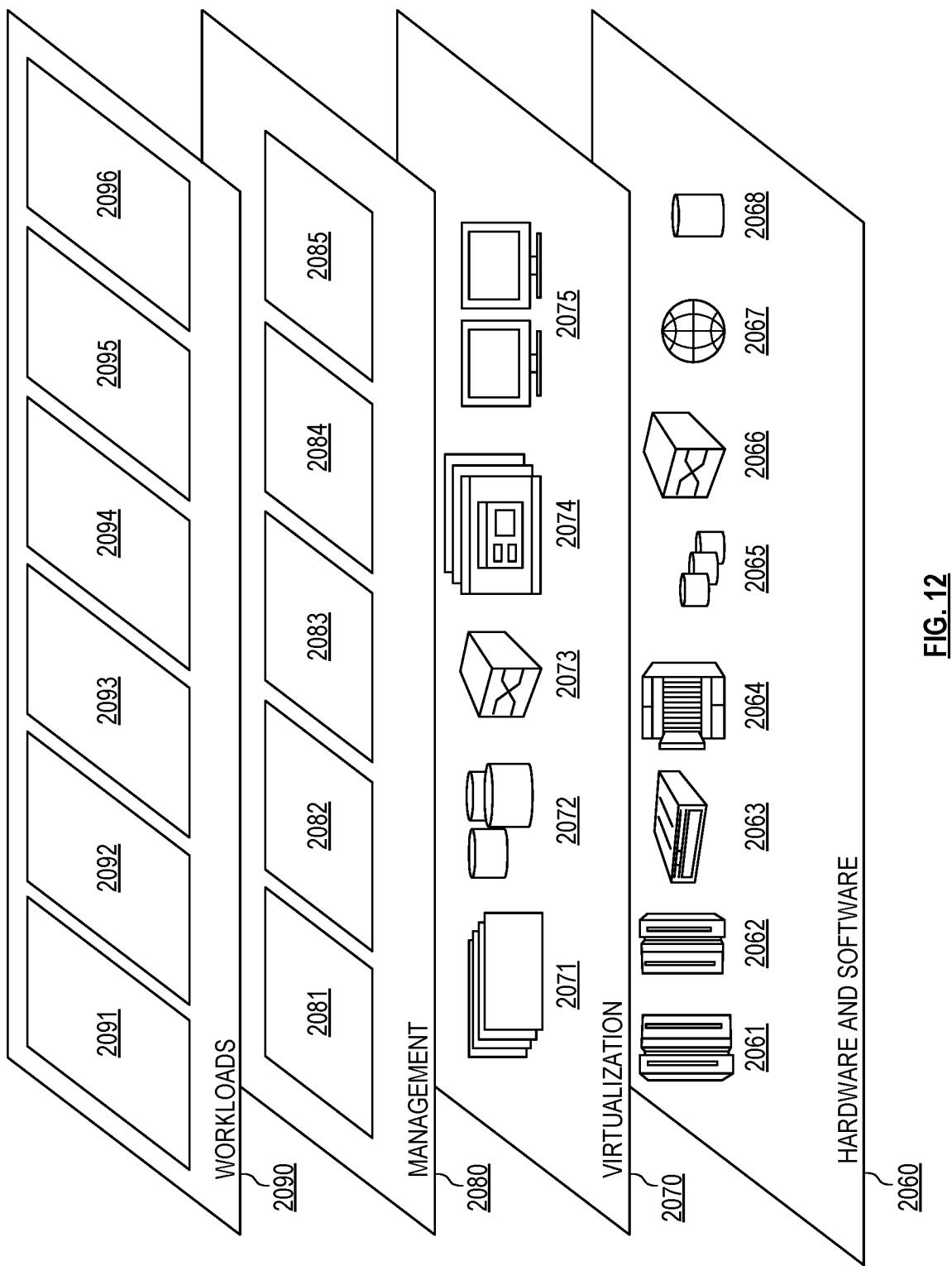
FIG. 12 depicts abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068. In some embodiments, one or more hardware components can be implemented by utilizing the computing device 2300 of FIG. 13.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and segmenting and/or merging system 2096. In some embodiments, the DSN 10 can utilize utilizing the cloud computing environment 2050, for example, by utilizing the segmenting and/or merging system 2096 of the workloads layer 2090 of FIG. 12 to perform segmenting and/or merging of data in the DSN as described in conjunction with FIGS. 1-10B, where some or all computing devices 12-16 of FIG. 1 and/or the DST processing unit 910 of FIG. 9A communicate with the network via a corresponding node 2010 of the cloud computing environment 2050.

Figure 13:
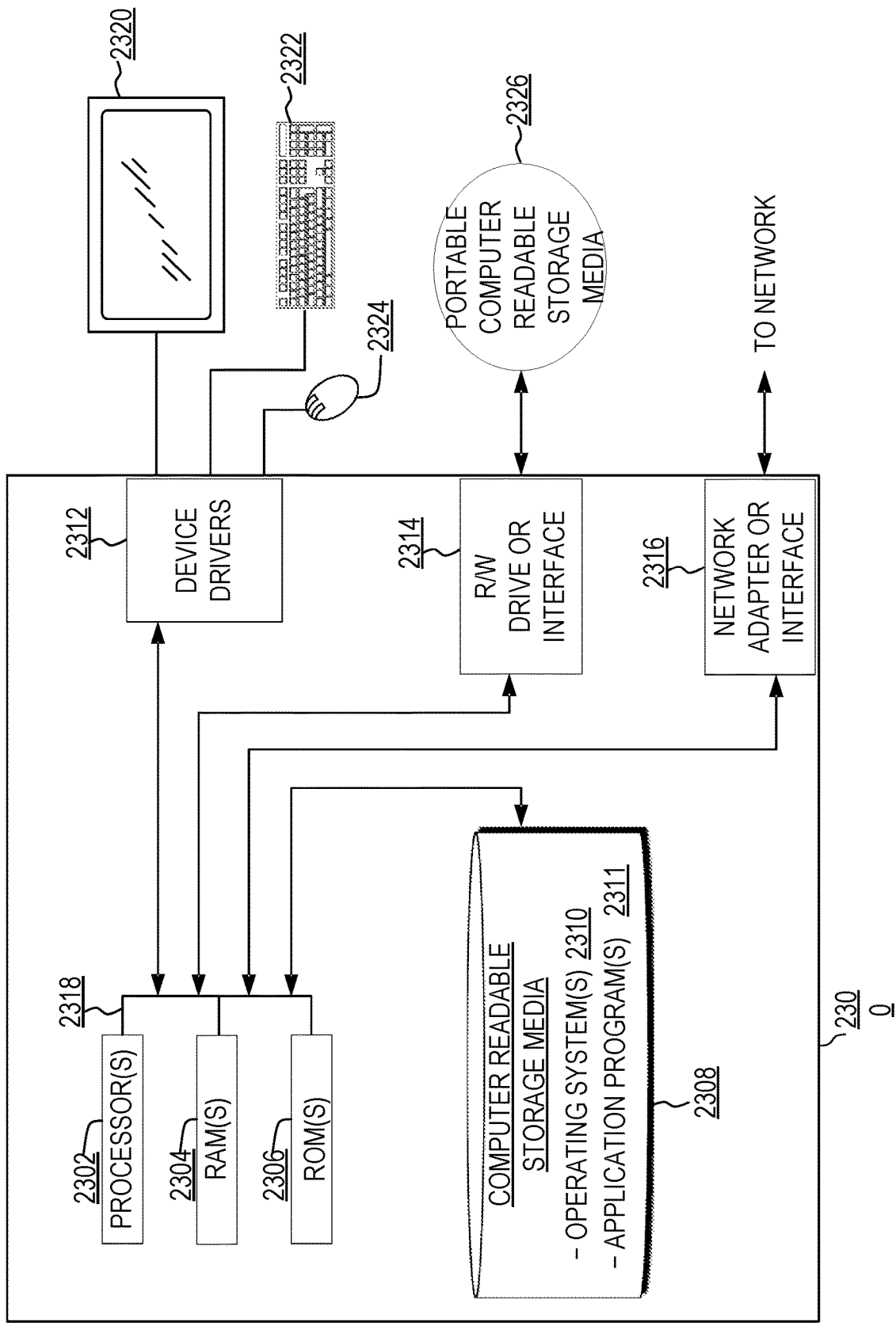
FIG. 13 depicts a block diagram of a computing device according to various embodiments of the present invention.

FIG. 13 depicts a block diagram of components of a computing device 2300, which can be utilized to implement some or all of the cloud computing nodes 2010, some or all of the computing devices 54A-N of FIG. 11, and/or to implement other computing devices described herein in accordance with an embodiment of the present invention. The computing device 2300 can be utilized to implement some or all of the plurality of computing devices 12-16 of FIG. 1, the DS client module 34 of FIG. 1, the managing unit of FIG. 1, the integrity processing unit 20 of FIG. 1, and/or storage units 36 of FIG. 1. For example the computing core 26 of FIG. 2 can be implemented by utilizing the computing device 2300. It should be appreciated that FIG. 13 provides only an illustration of one implementation and does not imply any limitations with regard to the environments in which different embodiments may be implemented. Many modifications to the depicted environment may be made.

Computing device 2300 can include one or more processors 2302, one or more computer-readable RAMs 2304, one or more computer-readable ROMs 2306, one or more computer readable storage media 2308, device drivers 2312, read/write drive or interface 2314, and network adapter or interface 2316, all interconnected over a communications fabric 2318. Communications fabric 2318 can be implemented with any architecture designed for passing data and/or control information between processors (such as microprocessors, communications and network processors, etc.), system memory, peripheral devices, and any other hardware components within the system.

One or more operating systems 2310 and/or application programs 2311, such as network application server software 2067 and database software 2068, are stored on one or more of the computer readable storage media 2308 for execution by one or more of the processors 2302 via one or more of the respective RAMs 2304 (which typically include cache memory). In the illustrated embodiment, each of the computer readable storage media 2308 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 2300 can also include a R/W drive or interface 2314 to read from and write to one or more portable computer readable storage media 2326. Application programs 2311 on computing devices 2300 can be stored on one or more of the portable computer readable storage media 2326, read via the respective R/W drive or interface 2314 and loaded into the respective computer readable storage media 2308.

Computing device 2300 can also include a network adapter or interface 2316, such as a TCP/IP adapter card or wireless communication adapter. Application programs 2311 on computing devices 2054A-N can be downloaded to the computing device from an external computer or external storage device via a network (for example, the Internet, a local area network or other wide area networks or wireless networks) and network adapter or interface 2316. From the network adapter or interface 2316, the programs may be loaded into the computer readable storage media 2308. The network may comprise copper wires, optical fibers, wireless transmission, routers, firewalls, switches, gateway computers and edge servers.

Computing device 2300 can also include a display screen 2320, a keyboard or keypad 2322, and a computer mouse or touchpad 2324. Device drivers 2312 interface to display screen 2320 for imaging, to keyboard or keypad 2322, to computer mouse or touchpad 2324, and/or to display screen 2320 for pressure sensing of alphanumeric character entry and user selections. The device drivers 2312, R/W drive or interface 2314, and network adapter or interface 2316 can comprise hardware and software stored in computer readable storage media 2308 and/or ROM 2306.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a dispersed storage and task (DST) processing unit that includes a processor, the method comprising:
receiving a first independent data element (IDE) for storage;
determining a first slice size requirement for the first IDE;
determining to split the first IDE based on determining the first IDE compares unfavorably to the first slice size requirement;
selecting at least one split location of the first IDE based on the first slice size requirement;
splitting content of the first IDE into a first plurality of IDEs in accordance with the at least one split location;
performing a dispersed storage error coding function on each of the first plurality of IDEs to produce a set of encoded slices for each of the first plurality of IDEs, wherein encoded slices of each set of encoded slices compare favorably to the first slice size requirement;
transmitting, via a network, each set of encoded slices to a corresponding set of storage units for storage;
receiving a set of additional IDEs for storage;
determining a second slice size requirement for at least one of the set of additional IDEs;
determining to merge the set of additional IDEs into at least one merged IDE based on determining the set of additional IDEs compare unfavorably to the second slice size requirement;
selecting a subset of the set of additional IDEs based on the second slice size requirement to be merged into a merged IDE;
concatenating content of the subset of the set of additional IDEs to produce the merged IDE;
performing the dispersed storage error coding function on the merged IDE to produce a second set of encoded slices for the merged IDE, wherein encoded slices of the second set of encoded slices compare favorably to the second slice size requirement; and
transmitting, via the network, the second set of encoded slices to a second corresponding set of storage units for storage.

2. The method of claim 1, further comprising:
selecting a second subset of the set of additional IDEs to be merged into a second merged IDE, wherein the subset of the set of additional IDEs and the second subset of the set of additional IDEs are mutually exclusive;
concatenating content of the second subset of the set of additional IDEs to produce the second merged IDE;
performing the dispersed storage error coding function on the second merged IDE to produce a third set of encoded slices for the second merged IDE, wherein encoded slices of the third set of encoded slices compare favorably to the second slice size requirement; and
transmitting, via the network, the third set of encoded slices to a third corresponding set of storage units for storage.

3. The method of claim 1, further comprising:
receiving a second IDE for storage;
determining a third slice size requirement for the second IDE, wherein the third slice size requirement indicates a smaller slice size than the first slice size requirement;
determining to split the second IDE based on determining the second IDE compares unfavorably to the third slice size requirement;

selecting at least one split location of the second IDE based on the third slice size requirement;

splitting content of the second IDE into a second plurality of IDEs in accordance with the at least one split location of the second IDE, wherein the second plurality of IDEs are smaller than the first plurality of IDEs in response to the third slice size requirement indicating the smaller slice size than the first slice size requirement;

performing the dispersed storage error coding function on each of the second plurality of IDEs to produce a set of encoded slices for each of the second plurality of IDEs, wherein encoded slices of each set of encoded slices for each of the second plurality of IDEs compare favorably to the third slice size requirement, and wherein encoded slices of each set of encoded slices for each of the second plurality of IDEs are smaller than encoded slices of each set of encoded slices for each of the first plurality of IDEs in response to the third slice size requirement indicating the smaller slice size than the first slice size requirement; and transmitting, via the network, each set of encoded slices for each of the second plurality of IDEs to a third corresponding set of storage units for storage.

4. The method of claim 3, wherein the third slice size requirement indicates a smaller slice size than the first slice size requirement in response to determining the second IDE has a higher access frequency than the first IDE.

5. The method of claim 3, wherein the third slice size requirement indicates a smaller slice size than the first slice size requirement in response to determining that a first requesting entity that requests access to the first IDE has a lower priority than a second requesting entity that requests access to the second IDE.

6. The method of claim 1, wherein the first slice size requirement indicates a first slice size for a first portion of the content, wherein the first slice size requirement indicates a second slice size for a second portion of the content, wherein the second slice size is different from the first slice size, wherein the at least one split location of the first IDE is selected to separate the first portion of the content from the second portion of the content, wherein a first one of the first plurality of IDEs corresponds to the first portion of the content, wherein a second one of the first plurality of IDEs corresponds to the second portion of the content, and wherein a first size of each encoded slice of a first set of encoded slices produced for the first one of the first plurality of IDEs is different from a second size of each encoded slice of a second set of encoded slices produced for the second one of the first plurality of IDEs in response to the first slice size requirement indicating the first slice size for the first portion of the content and indicating the second slice size for the second portion of the content.

7. The method of claim 6, wherein the content of the first IDE corresponds to video content, wherein the first portion of the content corresponds to a first quality of the video content, wherein the second portion of the content corresponds to a second quality of the video content that is higher than the first quality, wherein the first slice size requirement is selected based on a targeted time interval of the video content, wherein the at least one split location of the first IDE is selected such that the first plurality of IDEs compare favorably to the targeted time interval, and wherein the first size of each encoded slice of the first set of encoded slices produced for the first one of the first plurality of IDEs is smaller than the second size of each encoded slice of a second set of encoded slices produced for the second one of the first plurality of IDEs in response to the second portion having the second quality that is higher than the first quality of the first portion.

8. The method of claim 6, wherein the content of the first IDE corresponds to video content, wherein the first portion of the content corresponds to a first continuous interval of the video content, wherein the second portion of the content corresponds to a second continuous interval of the video content that is strictly after the first continuous interval, wherein the first slice size requirement is selected based on a ramping segmentation scheme, wherein the at least one split location of the first IDE is selected such that the first plurality of IDEs adhere to the ramping segmentation scheme, and wherein the first size of each encoded slice of the first set of encoded slices produced for the first one of the first plurality of IDEs is smaller than the second size of each encoded slice of a second set of encoded slices produced for the second one of the first plurality of IDEs in response to the second continuous interval of the video content being strictly after the first continuous interval.

9. The method of claim 8, wherein consecutive ones of the first plurality of IDEs increase in size in accordance with a non-decreasing function of the ramping segmentation scheme.

10. The method of claim 9, wherein at least one rate of increase in consecutive ones of the first plurality of IDEs is determined based on at least one of: a transmission rate or a playback rate of content of the first IDE.

11. The method of claim 1, further comprising:
generating a plurality of requests to a set of storage units for transmission to a set of currently stored encoded slices of the first IDE in response to determining current storage of the first IDE compares unfavorably to the first slice size requirement, wherein the first IDE is received as the set of currently stored encoded slices in response to the plurality of requests;

reproducing the first IDE by performing a dispersed storage error decoding function on the set of currently stored encoded slices, wherein the content of the reproduced first IDE is split into the first plurality of IDEs in accordance with the at least one split location; and generating a plurality of requests to delete the set of currently stored encoded slices for transmission to the set of storage units in response to determining the each set of encoded slices produced for the first plurality of IDEs have been stored successfully.

12. The method of claim 1, further comprising:
determining an updated first slice size requirement for the first IDE;
determining to further split the first IDE based on the updated first slice size requirement; and
transmitting a plurality of requests via the network, wherein each of the plurality of requests indicates an encoded slice of the each set of encoded slices of the first plurality of IDEs of the first IDE, wherein each of the plurality of requests is transmitted to a storage unit storing the encoded slice, wherein each of the plurality of requests further indicates at least one slice split location for the encoded slice based on the updated first slice size requirement, and wherein each storage unit facilitates splitting of the encoded slice indicated in the each of the plurality of requests in accordance with the at least one slice split location for the encoded slice indicated in the each of the plurality of requests.

13. The method of claim 1, further comprising:
determining an updated second slice size requirement for the merged IDE;

determining to further merge the merged IDE with another IDE stored in the second set of storage units based on the updated second slice size requirement; and transmitting a plurality of requests via the network, wherein each of the plurality of requests indicates an encoded slice of the merged IDE and further indicates an encoded slice of the another IDE, wherein each of the plurality of requests is transmitted to a storage unit of the second set of storage units storing the encoded slice of the merged IDE and the encoded slice of the another IDE, and wherein each storage unit facilitates merging of the encoded slice of the merged IDE with the encoded slice of the another IDE as indicated in the each of the plurality of requests.

14. A processing system of a dispersed storage and task (DST) processing unit comprising:

at least one processor;

a memory that stores operational instructions, that when executed by the at least one processor cause the processing system to:

receive a first independent data element (IDE) for storage;

determine a first slice size requirement for the first IDE;

determine to split the first IDE based on determining the first IDE compares unfavorably to the first slice size requirement;

select at least one split location of the first IDE based on the first slice size requirement;

split content of the first IDE into a first plurality of IDEs in accordance with the at least one split location;

perform a dispersed storage error coding function on each of the first plurality of IDEs to produce a set of encoded slices for each of the first plurality of IDEs, wherein encoded slices of each set of encoded slices compare favorably to the first slice size requirement;

transmit, via a network, each set of encoded slices to a corresponding set of storage units for storage;

receive a set of additional IDEs for storage;

determine a second slice size requirement for at least one of the set of additional IDEs;

determine to merge the set of additional IDEs into at least one merged IDE based on determining the set of additional IDEs compare unfavorably to the second slice size requirement;

select a subset of the set of additional IDEs based on the second slice size requirement to be merged into a merged IDE;

concatenate content of the subset of the set of additional IDEs to produce the merged IDE;

perform the dispersed storage error coding function on the merged IDE to produce a second set of encoded slices for the merged IDE, wherein encoded slices of the second set of encoded slices compare favorably to the second slice size requirement; and transmit, via the network, the second set of encoded slices to a second corresponding set of storage units for storage.

15. The processing system of claim 14, wherein operational instructions, when executed by the at least one processor, further cause the processing system to:

select a second subset of the set of additional IDEs to be merged into a second merged IDE, wherein the subset of the set of additional IDEs and the second subset of the set of additional IDEs are mutually exclusive;

concatenate content of the second subset of the set of additional IDEs to produce the second merged IDE;

perform the dispersed storage error coding function on the second merged IDE to produce a third set of encoded slices for the second merged IDE, wherein encoded slices of the third set of encoded slices compare favorably to the second slice size requirement; and transmit, via the network, the third set of encoded slices to a third corresponding set of storage units for storage.

16. The processing system of claim 14, wherein operational instructions, when executed by the at least one processor, further cause the processing system to:

receive a second IDE for storage;

determine a third slice size requirement for the second IDE, wherein the third slice size requirement indicates a smaller slice size than the first slice size requirement;

determine to split the second IDE based on determining the second IDE compares unfavorably to the third slice size requirement;

select at least one split location of the second IDE based on the third slice size requirement;

split content of the second IDE into a second plurality of IDEs in accordance with the at least one split location of the second IDE, wherein the second plurality of IDEs are smaller than the first plurality of IDEs in response to the third slice size requirement indicating the smaller slice size than the first slice size requirement;

perform the dispersed storage error coding function on each of the second plurality of IDEs to produce a set of encoded slices for each of the second plurality of IDEs, wherein encoded slices of each set of encoded slices for each of the second plurality of IDEs compare favorably to the third slice size requirement, and wherein encoded slices of each set of encoded slices for each of the second plurality of IDEs are smaller than encoded slices of each set of encoded slices for each of the first plurality of IDEs in response to the third slice size requirement indicating the smaller slice size than the first slice size requirement; and transmit, via the network, each set of encoded slices for each of the second plurality of IDEs to a third corresponding set of storage units for storage.

17. The processing system of claim 14, wherein the first slice size requirement indicates a first slice size for a first portion of the content, wherein the first slice size requirement indicates a second slice size for a second portion of the content, wherein the second slice size is different from the first slice size, wherein the at least one split location of the first IDE is selected to separate the first portion of the content from the second portion of the content, wherein a first one of the first plurality of IDEs corresponds to the first portion of the content, wherein a second one of the first plurality of IDEs corresponds to the second portion of the content, and wherein a first size of each encoded slice of a first set of encoded slices produced for the first one of the first plurality of IDEs is different from a second size of each encoded slice of a second set of encoded slices produced for the second one of the first plurality of IDEs in response to the first slice size requirement indicating the first slice size for the first portion of the content and indicating the second slice size for the second portion of the content.

18. The processing system of claim 14, wherein operational instructions, when executed by the at least one processor, further cause the processing system to:

generate a plurality of requests to a set of storage units for transmission to a set of currently stored encoded slices of the first IDE in response to determining current storage of the first IDE compares unfavorably to the first slice size requirement, wherein the first IDE is received as the set of currently stored encoded slices in response to the plurality of requests;

reproduce the first IDE by performing a dispersed storage error decoding function on the set of currently stored encoded slices, wherein the content of the reproduced first IDE is split into the first plurality of IDEs in accordance with the at least one split location; and generate a plurality of requests to delete the set of currently stored encoded slices for transmission to the set of storage units in response to determining the each set of encoded slices produced for the first plurality of IDEs have been stored successfully.

19. The processing system of claim 14, wherein operational instructions, when executed by the at least one processor, further cause the processing system to:

determine an updated first slice size requirement for the first IDE;

determine to further split the first IDE based on the updated first slice size requirement; and transmit a plurality of requests via the network, wherein each of the plurality of requests indicates an encoded slice of the each set of encoded slices of the first plurality of IDEs of the first IDE, wherein each of the plurality of requests is transmitted to a storage unit storing the encoded slice, wherein each of the plurality of requests further indicates at least one slice split location for the encoded slice based on the updated first slice size requirement, and wherein each storage unit facilitates splitting of the encoded slice indicated in the each of the plurality of requests in accordance with the at least one slice split location for the encoded slice indicated in the each of the plurality of requests.

20. A computer readable storage medium comprising:

a computer readable memory including one or more memory elements that include at least one memory section that stores operational instructions that, when executed by a processing system of a dispersed storage network (DSN) that includes a processor and a memory, causes the processing system to:

receive a first independent data element (IDE) for storage;

determine a first slice size requirement for the first IDE;

determine to split the first IDE based on determining the first IDE compares unfavorably to the first slice size requirement;

select at least one split location of the first IDE based on the first slice size requirement;

split content of the first IDE into a first plurality of IDEs in accordance with the at least one split location;

perform a dispersed storage error coding function on each of the first plurality of IDEs to produce a set of encoded slices for each of the first plurality of IDEs, wherein encoded slices of each set of encoded slices compare favorably to the first slice size requirement;

transmit, via a network, each set of encoded slices to a corresponding set of storage units for storage;

receive a set of additional IDEs for storage;

determine a second slice size requirement for at least one of the set of additional IDEs;

determine to merge the set of additional IDEs into at least one merged IDE based on determining the set of additional IDEs compare unfavorably to the second slice size requirement;

select a subset of the set of additional IDEs based on the second slice size requirement to be merged into a merged IDE;

concatenate content of the subset of the set of additional IDEs to produce the merged IDE;

perform the dispersed storage error coding function on the merged IDE to produce a second set of encoded slices for the merged IDE, wherein encoded slices of the second set of encoded slices compare favorably to the second slice size requirement; and transmit, via the network, the second set of encoded slices to a second corresponding set of storage units for storage.

* * * * *